UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

PAINT OR VARNISH REMOVER.

1,069,056. Specification of Letters Patent. Patented July 29, 1913.

No Drawing. Application filed October 12, 1907. Serial No. 397,075.

*To all whom it may concern:*

Be it known that I, CARLETON ELLIS, a citizen of the United States, and now residing at Larchmont, in the county of Westchester and State of New York, have made certain new and useful Inventions Relating to Paint or Varnish Removers, of which the following is a specification.

This invention relates to paint or varnish removers and relates especially to removers of an emulsified character in which the emulsifier has an acid character and is substantially immiscible with the other solvent material employed. For this purpose casein can be dissolved in acid aqueous solutions such as dilute hydrochloric acid or in many other acids. Other gelatinous or proteid bodies may be used to give the desired viscosity to the emulsifying medium, glue, isinglass, starch, Irish moss and other bodies being desirable and also other material, such as waste sulfite liquor is desirable in this connection, the liquor being used when concentrated without neutralization to a consistency of about 30° Baumé; or if this calcium lignosulfonate has been neutralized previous to or during its concentration, it may be given an acid character by the addition of a suitable amount of acid, such as acetic acid up to the extent of five to ten per cent. of the glacial material. When the emulsifier, preferably of the aqueous acid character indicated, has been prepared, the finish solvents may be thoroughly incorporated therewith by agitation in a suitable emulsifying apparatus, the alcoholic and other finish solvent ingredients in the remover being preferably such as are substantially, that is, to a large extent at least, immiscible with the aqueous portion of the emulsifier so that they are kept in such condition and concentration as to operate properly on the finish to which the remover is applied. The crude or quasi allyl alcohol obtained in alcohol production and sold under the name of allyl alcohol, is largely immiscible or insoluble in water, as is also amyl alcohol in its commercial form fusel oil as well as the wool tar oils which have a generally alcoholic character and similar solvent action. Various derivatives of these solvents may also be used, such, for instance, as amyl acetate. Of course, other loosening solvent material, that is, solvent material of a generally alcoholic character or action in removers, may be used in the remover when desired, such as the strict alcohols, methyl, ethyl, propyl, butyl, allyl and benzyl alcohols, for instance in their cheaper commercial forms, such as denatured alcohol and also other ketonic loosening finish solvents, such as methyl acetone, described in Ellis Patent No. 811,044, acetone and other ketones, acetone oil, light tar oil, resin oil, and so forth, and various derivatives thereof, including wood alcohol esters, sold under the name of esters by wood alcohol manufacturers. Suitable penetrating solvents, that is, finish solvent material of a generally benzolic character or action in removers may also be used, including benzol, toluol, xylol, cumene, as well as the petroleum products, benzin, gasolene, etc., and also carbon-bisulfid, carbon-tetrachlorid and other chlorinated compounds.

A typical illustrative remover of this character may comprise five ounces of casein dissolved in one gallon of a one-tenth per cent. aqueous solution of hydrochloric acid and emulsified with an equal volume of finish solvent material, consisting of equal parts of benzol and quasi allyl alcohol formed in wood alcohol production. Another illustrative remover may comprise one gallon of sulfite liquor of 30° Bé. acidified with one quart of acetic acid and emulsified with finish solvent material comprising benzol two gallons, fusel oil one gallon, amyl acetate one-half gallon and terpineol one-half gallon. Another desirable illustrative remover may comprise waste sulfite liquor containing free sulfurous acid one gallon, emulsified with composite finish solvent material composed of benzol or benzin two gallons and wood tar solvent oils boiling between 100° and 200° C. two gallons. Another illustrative remover may comprise casein 8 ounces together with four ounces of gelatin, if desired, dissolved in one gallon of a one-tenth per cent. hot aqueous solution of hydrochloric acid and emulsified with an equal volume of finish solvent material consisting of equal parts of benzol and wood tar solvent oils boiling between 100° and 200° C.

Having described this invention in connection with a number of illustrative ingredients and formulas, to the details of which disclosure in this case containing subject-matter taken from Ellis application, 375,015, filed May 22, 1907, the invention is not, of course, to be limited, what is claimed as new and what is desired to be secured by Letters Patent is set forth in the appended claims.

I claim—

1. The finish remover comprising an emulsifier consisting of five ounces of casein dissolved in one gallon of $\frac{1}{10}$th per cent. aqueous solution of hydrochloric acid emulsified with an equal volume of finish solvent material consisting of equal parts of benzol and quasi allyl alcohol.

2. The finish remover comprising approximately an emulsifier consisting of casein dissolved in a weak aqueous solution of hydrochloric acid and combined with substantially immiscible finish solvent material, including penetrating solvent and quasi allyl alcohol.

3. The finish remover comprising an emulsifier containing casein dissolved in weak aqueous solution of mineral acid combined with substantially immiscible finish solvent material containing loosening finish solvent material comprising an alcohol.

4. The finish remover comprising an emulsifier comprising casein dissolved in weak aqueous solution of mineral acid combined with finish solvent material comprising penetrating solvent material.

5. The finish remover comprising an emulsifier comprising proteid material dissolved in a weak solution of a mineral acid combined with finish solvent material comprising loosening solvent material.

6. The finish remover comprising an emulsifier comprising proteid material dissolved in a weak aqueous solution of a mineral acid combined with substantially immiscible finish solvent material, including penetrating solvent material.

7. The finish remover comprising an emulsifier comprising proteid material dissolved in a weak aqueous solution of a mineral acid combined with substantially immiscible finish solvent material comprising alcoholic material.

CARLETON ELLIS.

Witnesses:
HARRY L. DUNCAN,
JESSIE B. KAY.